(12) United States Patent
Bark et al.

(10) Patent No.: US 8,825,101 B2
(45) Date of Patent: Sep. 2, 2014

(54) METHOD AND ARRANGEMENT FOR POWER CONTROL DURING SOFT HANDOVER

(75) Inventors: Gunnar Bark, Linkoping (SE); Eva Englund, Linkoping (SE); Rong Hu, Sollentuna (SE); Niclas Wiberg, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/740,742

(22) PCT Filed: Dec. 6, 2007

(86) PCT No.: PCT/SE2007/050946
§ 371 (c)(1),
(2), (4) Date: Apr. 30, 2010

(87) PCT Pub. No.: WO2009/072945
PCT Pub. Date: Jun. 11, 2009

(65) Prior Publication Data
US 2010/0331035 A1    Dec. 30, 2010

(51) Int. Cl.
*H04W 52/24* (2009.01)
*H04W 52/50* (2009.01)
*H04W 52/12* (2009.01)
*H04W 52/28* (2009.01)
*H04W 52/14* (2009.01)
*H04W 52/36* (2009.01)
*H04W 52/40* (2009.01)
*H04W 36/18* (2009.01)
*H04W 36/08* (2009.01)

(52) U.S. Cl.
CPC ............ *H04W 52/40* (2013.01); *H04W 52/286* (2013.01); *Y02B 60/50* (2013.01); *H04W 52/146* (2013.01); *H04W 52/36* (2013.01); *H04W 36/18* (2013.01); *H04W 36/08* (2013.01)
USPC .......................... 455/522; 370/318

(58) Field of Classification Search
CPC ... H04W 52/24; H04W 52/50; H04W 52/367; H04W 52/12; H04W 52/40; H04W 52/146; H04W 52/241; H04W 52/38; H04W 52/04; H04W 72/0413
USPC .......................... 455/522; 370/318
See application file for complete search history.

(56) References Cited

U.S. PATENT DOCUMENTS 6,321,341 B1 * 11/2001 Kamijo et al. ............. 713/340
7,197,021 B2 * 3/2007 Seo et al. .................. 370/335
(Continued)

FOREIGN PATENT DOCUMENTS

| EP | 1 724 978 A2 | 11/2006 |
|---|---|---|
| EP | 1 788 720 A2 | 5/2007 |
| GB | 2 415 324 A | 12/2005 |

OTHER PUBLICATIONS

International Search Report dated Sep. 26, 2008 (4 pages).
(Continued)

*Primary Examiner* — Bobbak Safaipour
(74) *Attorney, Agent, or Firm* — Myers Bigel Sibley & Sajovec

(57) ABSTRACT

The present invention relates to a method and an arrangement of obtaining efficient power control during soft handover in a communication network system when a user equipment (18) is in communication with two or more radio base stations (15a, 15b) over a radio interface on downlink (17) and uplink (16) channels. Transmit power control (TPC) commands are received from said two or more radio base stations (15a, 15b) on said downlink channels (17). Said received transmit power control commands are analyzed and a power offset on said uplink channels (16) is adjusted based on said analyzed transmit power control commands.

15 Claims, 3 Drawing Sheets

(56) References Cited

U.S. PATENT DOCUMENTS

| | | | |
|---|---|---|---|
| 7,206,596 B2* | 4/2007 | Nishio | 455/522 |
| 7,546,136 B2* | 6/2009 | Lindoff | 455/522 |
| 7,725,121 B2* | 5/2010 | Ishii et al. | 455/522 |
| 7,808,956 B2* | 10/2010 | Petrie et al. | 370/337 |
| 2001/0028677 A1* | 10/2001 | Wang et al. | 375/148 |
| 2003/0039217 A1* | 2/2003 | Seo et al. | 370/318 |
| 2004/0058700 A1* | 3/2004 | Nilsson et al. | 455/522 |
| 2004/0203985 A1* | 10/2004 | Malladi et al. | 455/522 |
| 2004/0242255 A1* | 12/2004 | Hayashi et al. | 455/522 |
| 2004/0248606 A1* | 12/2004 | Suzuki et al. | 455/522 |
| 2005/0277419 A1 | 12/2005 | Takano et al. | |
| 2006/0246937 A1 | 11/2006 | Lindoff | |

OTHER PUBLICATIONS

International Preliminary Report on Patentability dated Oct. 16, 2009 (5 pages).
Written Opinion dated Sep. 26, 2008 (8 pages).
First Office Action, Chinese Patent Application No. 200780101797. 2, Nov. 5, 2012.

* cited by examiner

METHOD AND ARRANGEMENT FOR POWER CONTROL DURING SOFT HANDOVER

TECHNICAL FIELD

The present invention relates to a method and an arrangement in a communication network system and, more particular, to an arrangement allowing for efficient power control during soft handover as well as a method for such control.

BACKGROUND

Power control and soft handover are two crucial ingredients of the Wideband Code Division Multiple Access (WCDMA) air interface.

Power control is used to continuously adjust the transmitted power such that the received quality is good enough, but not better. This way, not more than necessary interference is created. The principle of the power control is that the receiver sends power control commands, "Transmit Power Control (TPC) bits", each indicating either "down" or "up", depending on whether it's received quality is good enough or not.

Soft handover provides a gain in fast fading radio environments, often referred to as "macro diversity". The user equipment is then in communication with two or more base stations at the same time. The overall quality is good enough if at least one of the radio links has good enough quality.

The power control ensures that this is the case. Each base station transmits power control commands depending on its received quality. The user equipment combines the power control commands and increases its power only if all base stations request a power increase, otherwise it decreases its power.

On the uplink (UL), each base station receives and tries to decode the data sent by the user equipment. The result of this attempt is then passed along to a diversity-combining unit (located in the radio network controller, RNC), in which data from all involved base stations is received. The diversity-combining unit considers the data received from all involved base stations, and selects the one that is most likely to be correct.

Note that any particular base station is not in general capable of correctly decoding all, or even most of, the data transmitted by the user equipment. This is because the user equipment's transmitted power will be set such that only the currently most favourable base station will have good enough quality.

In an uplink from a user equipment to a radio base station, the transmission powers of different uplink channels usually are set relative to a reference channel, for example in Wideband Code Division Multiple Access (WCDMA) the Dedicated Physical Control Channel (DPCCH). The power difference relative to the reference channel is called power offset, i.e. a transmission power value on the uplink channel is determined by adding a power offset value to a pre-determined reference power value.

While most of the data transmitted by the user equipment is directed towards one or more destinations in the network, some data is intended to be used by the base stations directly. In the Third Generation Partnership Project (3GPP) Rel. 99, such data is part of the uplink dedicated physical control channel, or uplink DPCCH. Examples of such data are the transmit power control (TPC) field used for downlink power control and the feedback (FB) field. In 3GPP Rel. 5, an additional uplink physical control channel, the HS-DPCCH, with more data fields of this type is introduced, in particular an acknowledgement field for the high-speed downlink shared channel (HS-DSCH). Some of these data fields are intended to be used by all involved base stations, while other fields are to be used by one particular base station.

For UL DPCCH, a problem with this type of data occurs in soft handover, when a particular base station may be unable to decode the data that it needs. This may cause performance degradation of vital functions in the base station, such as downlink power control or automatic retransmissions.

For UL DPCCH, a traditional solution to the mentioned problem is to use a fixed higher power (or, equivalently, repeated bits) for the data fields that are to be decoded by all involved base stations. This traditional solution has, however, a drawback of higher power consumption and a larger interference, even in situations where the extra power is unnecessary.

For UL HS-DPCCH, a problem is that when the UL power is controlled by the non-HS serving cell, HS-DPCCH transmission power decreases (because the user equipment is approaching to that non-HS cell). As a result, the transmitted HS-DPCCH power is not enough to overcome its UL pathloss back to the HS serving cell and the HS-DPCCH performance becomes very bad. The base station can not decode correct information (e.g. wrong channel quality indication (CQI) or Hybrid Automatic Repeat Request (HARQ) acknowledgement (ACK)) from HS-DPCCH and uses this incorrect information to schedule the transmission. Finally, the HSDPA performance could be impacted.

An example of an unbalanced UL/DL problem explanation is shown in FIG. 2, in which the UE is moving from cell A (serving cell) served by RBS 15a to cell B (non-serving cell) served by RBS 15b illustrated with arrow M. The diagrams comprise a soft handover area, SHO. The Ec/No of cell A is denoted 21 and the Ec/No of cell B is denoted 22 in the upper diagram of FIG. 2. In the lower diagram of FIG. 2, cell A's pathloss+$I_{UL}$ is denoted 23 and cell B's pathloss+$I_{UL}$ is denoted 24. The UE follows the continuous line 25 to control its Tx power. As can be seen from FIG. 2, in the area 26, cell A is serving cell but the uplink power is controlled by cell B, which will cause a bad HS-DPCCH quality received by the serving cell A, and could have a wrong detection of CQI or HARQ acknowledgement.

Similar to the case for the DPCCH, a traditional solution for HS-DPCCH is either to use different power offsets for soft handover (SHO) users and non-SHO users or to use an ACK/NACK repetition method to improve the quality. Field test results have, however, shown that a larger HS-SCCH power offset for SHO users doesn't improve the HS-DPCCH quality so much in an unbalanced cell case.

An efficient power setting of HARQ feedback channels has been proposed where errors in the feed back information for HARQ processes are detected and this information is used to adjust the power for the feedback channel. This method, however, relies only on the ACK/NACK transmission and will only react when the power is already too low Thus there is a need for an improved power offset control in soft handover.

SUMMARY

Accordingly, one objective with the present invention is to provide an improved method of obtaining efficient power control during soft handover in a communication network system when a user equipment is in communication with two or more radio base stations over a radio interface on downlink and uplink channels.

According to a first aspect of the present invention this objective is achieved through a method as defined in the characterising portion of claim 1, which specifies that efficient power control is obtained by a method which performs the steps of receiving transmit power control (TPC) commands from said two or more radio base stations on said downlink channels; analysing said received transmit power control commands; and, adjusting a power offset on said uplink channels based on said analysed transmit power control commands.

A further objective of the present invention is to provide an improved arrangement in a user equipment of obtaining efficient power control during soft handover in a communication network system when the user equipment is in communication with two or more radio base stations over a radio interface on downlink and uplink channels.

According to a second aspect of the present invention this further objective is achieved through an arrangement as defined in the characterising portion of claim 8, which specifies the efficient power control is obtained by an arrangement which comprises means for receiving transmit power control (TPC) commands from said two or more radio base stations on said downlink channels; means for analysing said received transmit power control commands; and, means for adjusting a power offset on said uplink channels based on said analysed transmit power control commands.

Further embodiments are listed in the dependent claims.

The essential merits of the invention are decreased uplink interference and decreased power consumption in the mobile station.

Similar to a conventional "OR" TPC combining algorithm where the mobile station decreases its transmission power if any received TPC command is "down" command, this invention also requires the mobile station to separately decode TPC commands from all involved cells, which is doable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
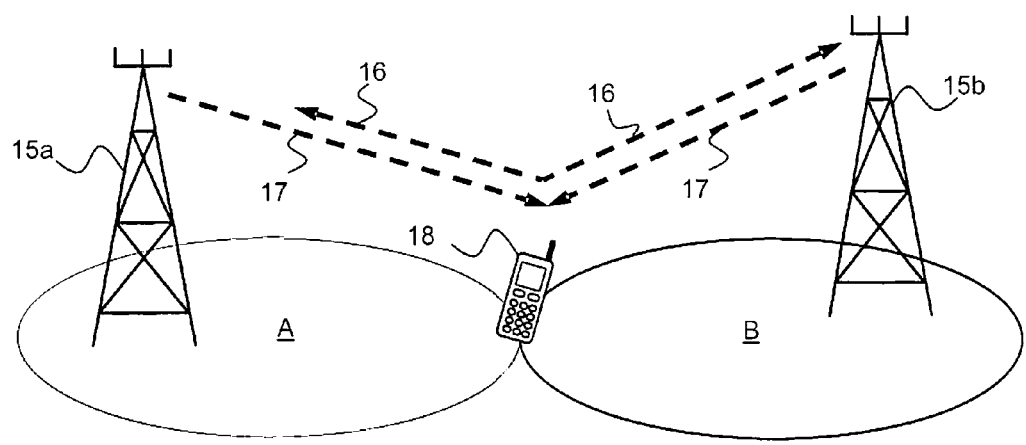
FIG. 1 is an exemplary block diagram of a mobile communication network.
Figure 2:
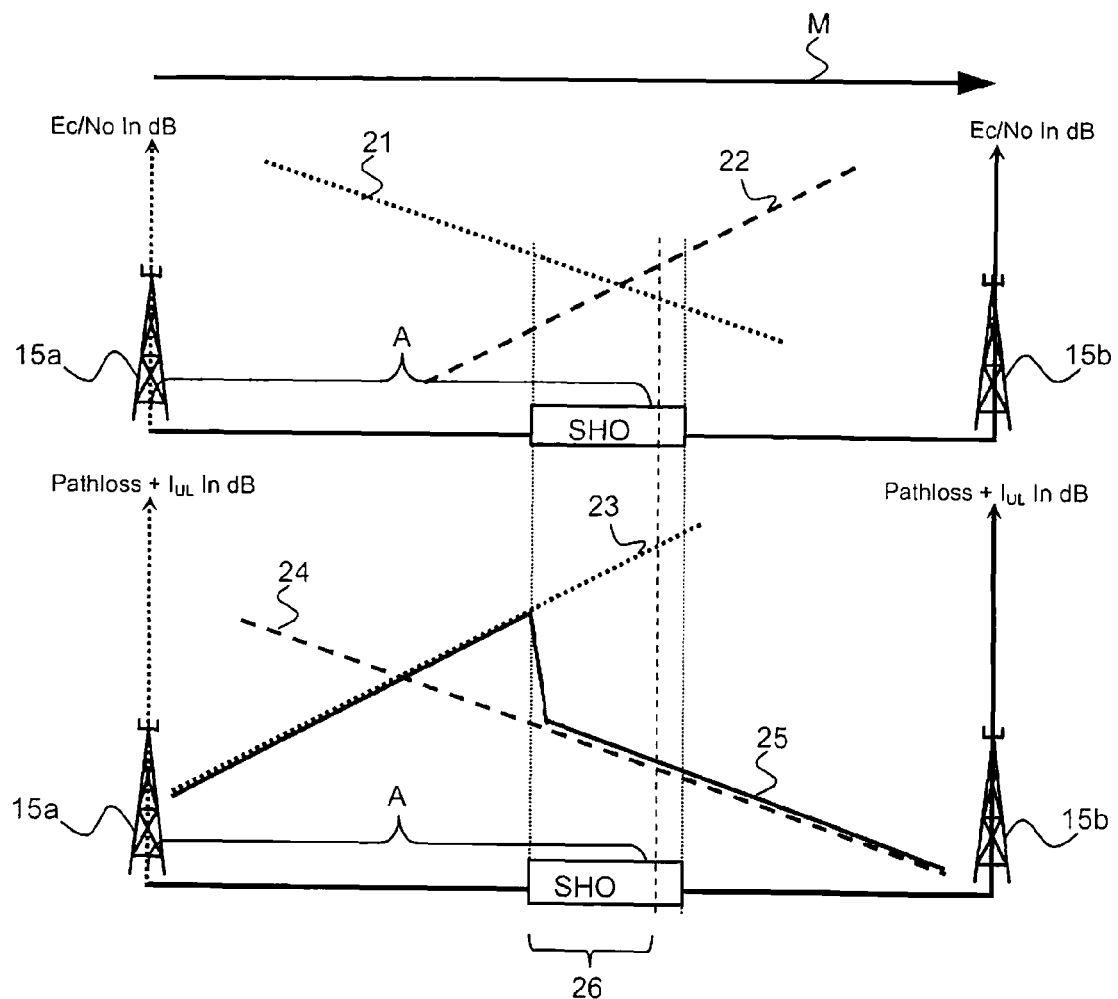
FIG. 2 is an illustration of an unbalanced uplink/downlink in a mobile communication network.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B) 15a-b, connected to one or more Radio Network Controllers (RNCs) (not shown in FIG. 1) and each serving a cell A and B respectively. The RAN is connected over an interface to a Core network (CN), which may be a connection-oriented external CN such as the Public Switched Telephone Network (PSTN) or the Integrated Services Digital Network (ISDN), and/or a connectionless external CN as the Internet.

The RAN and the CN provide communication and control for a plurality of user equipments (UE) 18 (only one shown in FIG. 1). The UEs 18 each uses downlink (DL) channels 17 and uplink (UL) channels 16 to communicate with at least one RBS 15 over a radio or air interface. On the downlink channel 17, the RBS 15 transmits data to each user equipment 18 at respective power level. On the uplink channel 16, the user equipments 18 transmit data to the RBS 15 at respective power level. As illustrated in FIG. 1, in WCDMA when performing a handover the UE 18 continues to communicate with the communication system via the old RBS 15a at least until a dedicated radio channel is established also to the new RBS 15b.

According to a preferred embodiment of the present invention, the communication system is herein described as a WCDMA communication system. The skilled person, however, realizes that the inventive method and arrangement works very well on all communications system, such as the Global System for Mobile communications (GSM) or Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

According to a preferred embodiment of the present invention a variable power offset for the data fields that are to be decoded by all base stations is used. The power offset is adjusted such that it is large when one or more base stations that need to decode the fields would not be able to do so; otherwise, the power offset is small or zero. The solution is based on received TPC commands or together with HARQ error detecting.

Based on Received TPC Commands

One mechanism of adjusting the power offset lies in the combination process of the received power control commands in the mobile station. The mobile station makes a statistic of TPC commands from both the serving cell and non-serving cell. If many "up" commands (>>50%) from the serving cell but ~50% of "up" from the non-serving cell, this indicates something wrong with the UL to the serving cell, the mobile station should boost HS-DPCCH power offset in this case.

For instance, suppose a situation with two involved base stations, A and B, such that A receives the signal with good enough quality but B does not. Then base station A will transmit approximately 50% "up" commands and 50% "down" commands, while the base station B will transmit more "up" commands than "down" commands. This is a situation that the mobile station can detect. Assuming that the mobile station knows that there are some data fields that are important for the base station B to receive correctly, and that it detects the above situation, it should apply a positive power offset to the critical data fields. On the other hand, if the mobile station receives approximately the same fraction of "up" commands from both base stations, then the power offset can be decreased or set to zero.

There are several variants to this idea. For example:

The power offset may be increased every time if a received TPC "up" command is neglected when a UE does a TPC command combining, and decreased every time this does not happen. This requires upper and lower limits to the offset, to work properly. Note: The power offset is only for some fields of the channel, for example, the CQI field, but the power control command is applied to the whole channel. Thus if a TPC "up" command is applied and the power offset isn't changed, the power of such fields could be unnecessarily high, causing power waste. Thus, the power offset for such fields needs to be decreased in order to keep the quality good enough, neither too good nor too bad.

Once the mobile station enters into the SHO area, the HS-DPCCH power offset adjustment only follows the TPC commands from the serving cell to improve the HS-DPCCH reception. This also requires upper and lower limits to the offset, to work properly. Otherwise, the HS-DPCCH power offset could become very large, resulting in an unnecessary high transmission power, as the adjustment only considers the DPCCH quality, rather than the received HS-DPCCH quality.

Based on Both Received TPC Commands and the HS-DSCH HARQ Status

For the HS-DPCCH power offset adjustment, there is one more measurement than can be utilized, that is HS-DSCH HARQ status. As the user equipment knows that it sends out ACK after it correctly decodes the HS-DSCH data, but if it still receives the retransmission data from the serving cell, this case indicates that the UL quality is not good enough, resulting in a bad ACK transmission. And if the received TPC commands from the serving cell are most "up" commands, this also indicates the bad UL quality. Therefore, the received TPC commands together with the HARQ status may be used to better identify the UL quality. The HS-DPCCH power offset may be adjusted based on them together.

Figure 3:
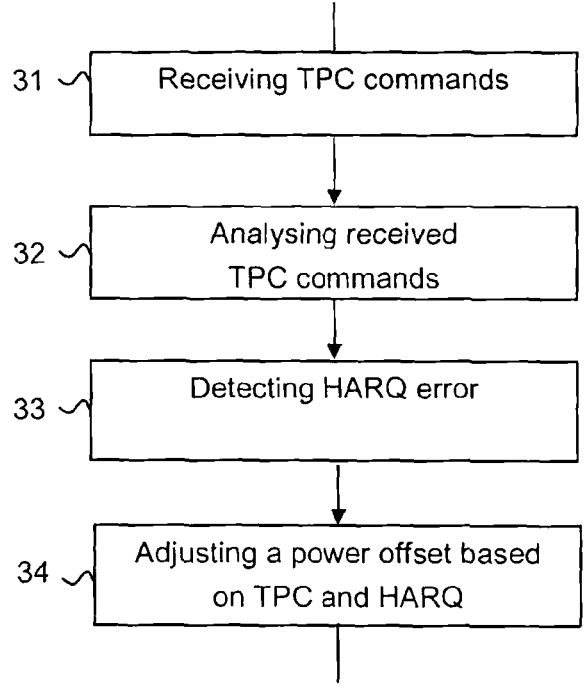
FIG. 3 is a flow chart illustrating the inventive method.

The procedure in a communication network system for obtaining efficient power control during soft handover when a user equipment 18 is in communication with two or more radio base stations 15 over a radio interface on downlink 17 and uplink 16 channels, shown in FIG. 3 is as follows:

Receiving transmit power control (TPC) commands from said two or more radio base stations on the downlink channels (step 31);

analysing the received transmit power control commands (step 32);

optionally, detecting HARQ error (step 33);

adjusting a power offset on said uplink channels based on said analysed transmit power control commands and also optionally on said HARQ status (step 34).

Figure 4:
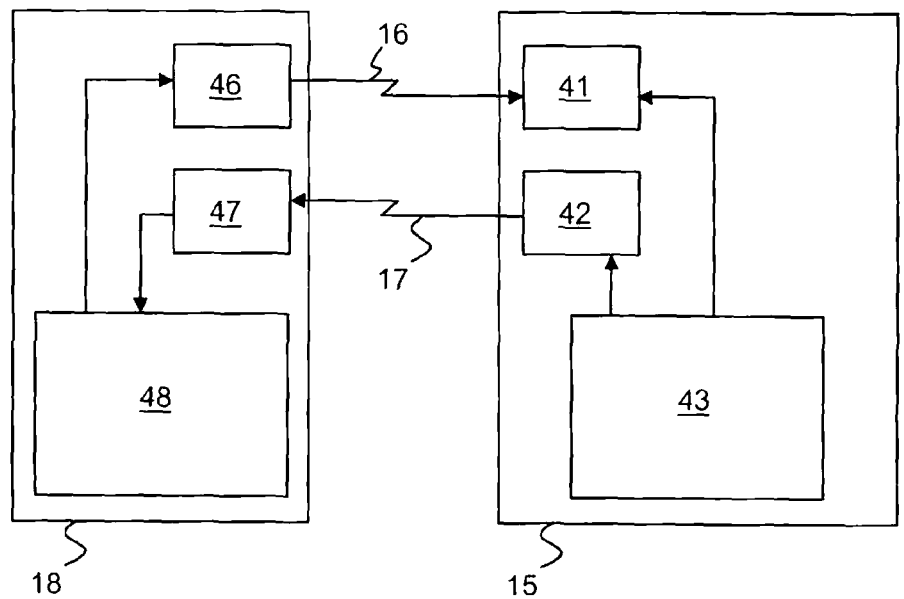
FIG. 4 is a block diagram of the inventive radio base station and user equipment.

FIG. 4 is a block diagram showing a user equipment 18 and a radio base station (RBS) 15, such as Node B, for obtaining efficient power control during soft handover in a communication network system when a user equipment 18 is in communication with two or more radio base stations 15 over a radio interface on downlink 17 and uplink 16 channels. The RBS 15 comprises a radio transmitter 42 and a receiver 41. The transmitter 42 is transmitting data to a receiver 47 of the user equipment 18 over the radio interface on the downlink channel 17. The receiver 41 is receiving data from the user equipment 18 on the uplink channel 16. The RBS 15 further comprises means 43 for controlling the TPC commands sent by the transmitter 42 to the user equipment 18.

The user equipment 18 comprises a radio transmitter 46 arranged to transmit data packets to the receiver 41 of the RBS 15 over the radio interface on the uplink channel 16 and a receiver 47 arranged to receive data packets transmitted from the transmitter 42 of the RBS 15 on the downlink channel 17. The user equipment 18 further comprises means 48 for analysing received TPC commands and for adjusting the power offset. The means 48 for analysing received TPC commands is further arranged to detect a HARQ error and to use the HARQ status when adjusting the power offset.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of obtaining efficient power control during soft handover in a communication network system when a user equipment is in communication with a serving radio base station and at least one non-serving radio base station over a radio interface on downlink and uplink channels, the method comprising:

receiving, at the user equipment, transmit power control (TPC) commands from said serving radio base station and said at least one non-serving radio base station on said downlink channels;

storing the received transmit power control commands;

analyzing, at the user equipment, said stored transmit power control commands, by statistically comparing stored transmit power control commands from the serving radio base station with the stored transmit power control commands from the at least one non-serving radio base station; and when there is a discrepancy between the stored transmit power commands from the serving radio base station with the stored transmit power control commands from the at least one non-serving radio base station, adjusting a power offset on said uplink channels based on said analyzed transmit power control commands.

2. The method according to claim 1, where said serving radio base station and at least one non-serving radio base station send up transmit power control commands to indicate that said user equipment should increase a transmit power and send down transmit power control commands to indicate that said user equipment should decrease said transmit power, where the method further comprises:

decreasing said power offset when a same number of up transmit power control commands is received from said serving radio base station and at least one non-serving radio base station.

3. The method according to claim 1, where said serving radio base station and at least one non-serving radio base station send up transmit power control commands to indicate that said user equipment should increase a transmit power and send down transmit power control commands to indicate that said user equipment should decrease said transmit power, where the method further comprises:
setting said power offset to zero when a same number of up transmit power control commands is received from said serving radio base station and at least one non-serving radio base station.

4. The method according to claim 1, where the method further comprises:
increasing said power offset when an up transmit power control command is neglected by said user equipment when doing a transmit power control command combining operation;
decreasing said power offset when said up transmit power control command is followed by the user equipment.

5. The method according to claim 1, where the method further comprises:
defining a power offset upper limit and a power offset lower limit.

6. The method according to claim 1, where the method further comprises:
adjusting said power offset according to said transmit power control commands from said serving radio base station.

7. The method according to claim 1, where the method further comprises:
using a hybrid automatic retransmission request (HARQ) status when adjusting said power offset.

8. An arrangement, in a user equipment, for obtaining efficient power control during soft handover in a communication network system when said user equipment is in communication with a serving radio base station and at least one non-serving radio base station over a radio interface on downlink and uplink channels, the arrangement comprising:
means for receiving transmit power control (TPC) commands from said serving radio base station and at least one non-serving radio base station on said downlink channels and for storing said transmit power control commands;
means for analyzing said stored transmit power control commands, by statistically comparing stored transmit power control commands from the serving radio base station with the stored transmit power control commands from the at least one non-serving radio base station; and
means for adjusting a power offset on said uplink channels based on said analyzed transmit power control commands when there is a discrepancy between the stored transmit power commands from the serving radio base station with the stored transmit power control commands from the at least one non-serving radio base station.

9. The arrangement according to claim 8, where said serving radio base station and at least one non-serving radio base station are arranged to send up transmit power control commands to indicate that said user equipment should increase a transmit power and to send down transmit power control commands to indicate that said user equipment should decrease said transmit power, where the arrangement further comprises:
means for decreasing said power offset when a same number of up transmit power control commands is received from said serving radio base station and at least one non-serving radio base station.

10. The arrangement according to claim 8, where serving radio base station and at least one non-serving radio base station are arranged to send up transmit power control commands to indicate that said user equipment should increase a transmit power and to send down transmit power control commands to indicate that said user equipment should decrease said transmit power, where the arrangement further comprises:
means for setting said power offset to zero when a same number of up transmit power control commands is received from said serving radio base station and at least one non-serving radio base station.

11. The arrangement according to claim 8, where the arrangement further comprises:
means for increasing said power offset when an up transmit power control command is neglected by said user equipment when doing a transmit power control command combining operation; and
means for decreasing said power offset when said up transmit power control command is followed by the user equipment.

12. The arrangement according to claim 8, where said power offset has an upper limit and a lower limit.

13. The arrangement according to claim 8, where said means for adjusting said power offset is arranged to adjust said power offset according to said transmit power control commands from said serving radio base station.

14. The arrangement according to claim 8, where the arrangement further comprises:
means for using a hybrid automatic retransmission request (HARQ) status when adjusting said power offset.

15. A method in a user equipment, comprising:
receiving transmit power control (TPC) commands from a serving cell and from at least one non-serving cell when the user equipment is in soft handover;
storing the received TPC commands;
statistically comparing the stored TPC commands from the serving cell with the stored TPC commands from the at least one non-serving cell;
when there is a discrepancy between the stored TPC commands from the serving cell and the stored TPC commands from the at least one non-serving cell, adjusting a power offset on an uplink channel on which the user equipment communicate with the serving and non-serving cells.

* * * * *